Figure 1:
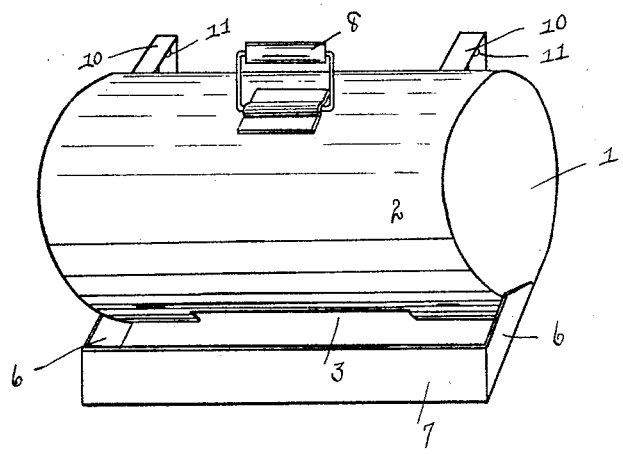

G. C. EATON.
WATERING DEVICE.
APPLICATION FILED JUNE 19, 1911.

1,108,151.

Patented Aug. 25, 1914.

WITNESSES:
T. L. Wilder
E. E. Risley

INVENTOR
GEORGE C. EATON

BY Risley & Love
ATTORNEYS

UNITED STATES PATENT OFFICE.

GEORGE C. EATON, OF NORWICH, NEW YORK.

WATERING DEVICE.

1,108,151.  Specification of Letters Patent.  Patented Aug. 25, 1914.

Application filed June 19, 1911.  Serial No. 634,037.

*To all whom it may concern:*

Be it known that I, GEORGE C. EATON, a citizen of the United States, residing at Norwich, in the county of Chenango and State of New York, have invented certain new and useful Improvements in Watering Devices, of which the following is a specification, reference being had therein to the accompanying drawing.

My invention relates to an improved watering trough for poultry, and I declare that the following is a full, clear, concise and exact description thereof, sufficient to enable one skilled in the art to make and use the same, reference being had to the accompanying drawings in which like reference characters refer to like parts throughout.

Figure 3:
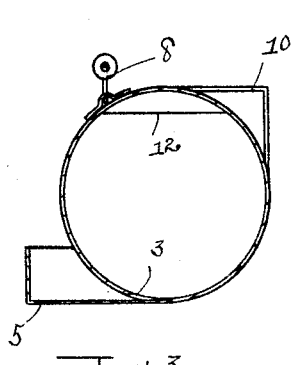
Figure 2:
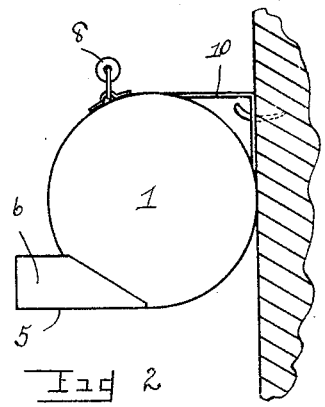

In the drawings Figure 1 is a perspective view of the device; Fig. 2 is an end view, and Fig. 3 is a sectional view.

The device consists of a cylindrical body with end pieces 1 and wall 2. The only opening is at 3, as indicated in Fig. 3, the said opening extending substantially the length of the cylindrical body. A trough portion is attached to this cylindrical body, the same consisting of a bottom 5, end pieces 6 and front 7. The end pieces and the front form the walls of the trough which opens into the cylindrical body at 3. A bail is provided, indicated at 8.

On the outer portion of the cylindrical body are placed angular brackets 10, 10, each being pierced as at 11 (Fig. 1), so that the device can be supported on a wall or in other fixed position. The brackets 10, however, have a further function or utility in that they prevent the device from being rolled into an incorrect position. It will be seen that the weight of the trough portion normally holds the device upright, but if it should in any way be rolled over the brackets 10 will stop it and the weight of the contents or the weight of the trough alone would restore it to upright position.

The method of filling the device is apparent, but from its construction it can not be completely filled with water but only to a line near the top, as indicated by 12. The utility of this is that allowance is thus provided for the expansion of the water when frozen, without doing any harm to the device, itself.

Having described my invention, what I claim as new and desire to secure by Letters Patent, is:

1. A self-righting watering device consisting of a cylindrical body, a trough with its bottom projecting tangentially from the wall of the body, the body having a longitudinal slit through its wall opening into the trough near the bottom thereof, and brackets with their sides tangential to the body mounted thereon substantially opposite the trough whereby to act as a stop to prevent rolling of the device.

2. A device of the character described consisting of a cylindrical body, a trough projecting with its bottom tangential to the wall of the body and of a size and weight to support and maintain the device normally in upright position, and brackets mounted on and a part of the body and projecting from the wall whereby to prevent rolling of the device into inverted position.

3. A device of the character described consisting of a cylindrical body, the wall of the body extending tangentially from one point in the circumference whereby to form the bottom of a trough extending a substantial distance beyond a vertical line dropped from the side of the device, and brackets placed on the body substantially opposite the trough to prevent the rolling of the device beyond the quarter of a revolution.

4. A self-righting watering device consisting of a cylindrical body, a trough projecting from one side and of a size and weight normally to hold the device in position for use, and means mounted on the body and projecting therefrom opposite the trough to serve as a stop in the rolling of the device, the said means being formed whereby to support the device in elevated fixed position.

In testimony whereof I hereunto affix my signature in the presence of two witnesses.

GEORGE C. EATON.

Witnesses:
  LESTER BLACKMAN,
  FLOYD DUNCAN.